Patented Sept. 19, 1939

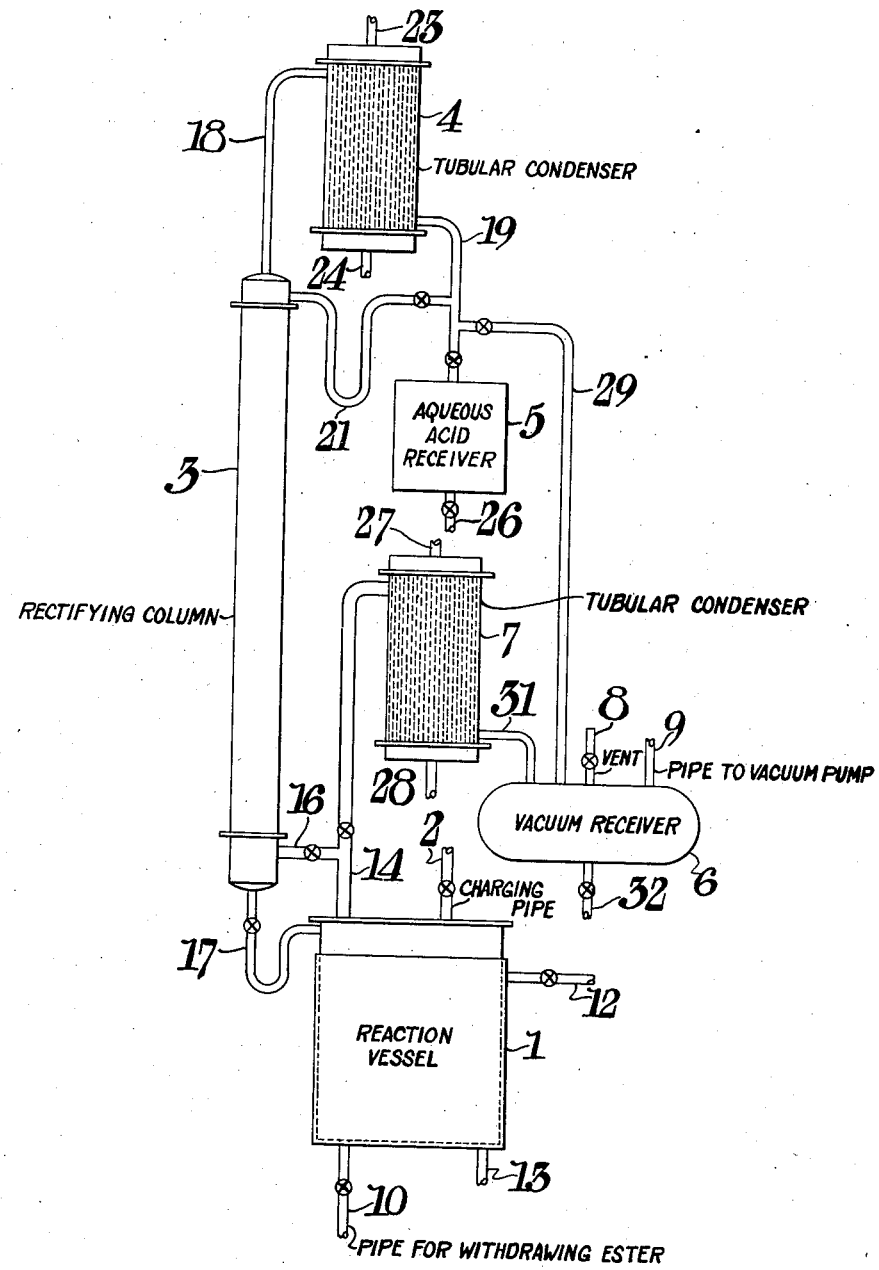

2,173,124

UNITED STATES PATENT OFFICE 2,173,124

MANUFACTURE OF ORGANIC ESTERS OF HIGHER ALCOHOLS AND LOWER ALIPHATIC ACIDS

Lester W. A. Meyer and Frederick R. Conklin, Kingsport, Tenn., assignors, by mesne assignments, to Eastman Kodak Company, Jersey City, N. J., a corporation of New Jersey Application January 4, 1936, Serial No. 57,601

18 Claims. (Cl. 260—488)

This invention relates to the manufacture of organic esters of the higher alcohols with the aliphatic acids. More particularly, this invention concerns a process for producing complete esterification by reacting an aliphatic acid or a mixture of aliphatic acids and a higher alcohol having a higher boiling point than the aliphatic acid or acids.

The general reaction of an acid and an alcohol to produce an ester is well known and may be expressed by the equation:

acid+alcohol⇌ester+water

This is a balanced reaction and in the primary action equilibrium results before all of the acid is converted into the ester, and hence, free acid and alcohol may exist in the product.

Various methods prior to our invention have been employed to disturb the balanced reaction in order to cause greater yield of ester. One common method is as described in U. S. Patent 2,005,371 and comprises employing a water withdrawing agent, such as an aromatic hydrocarbon, with the alcohol and acid. By subsequently distilling the reaction mixture under proper conditions an azeotropic mixture of aromatic hydrocarbon and water distils off. In this way, the water formed during the esterification as well as any water present in the starting materials is withdrawn from the reaction mixture. U. S. Patents 1,421,605 and 1,695,449 may also be referred to for this type of process.

It is also known in producing organic esters in accordance with the process described in British Patent 131,678 to employ an excess of alcohol which assists in removing the water from the reaction mixture.

The process of the present invention provides a novel method for shifting the equilibrium and causing the esterification reaction to proceed to the right until practically complete. Our novel method also allows the alcohol and ester to remain in the reaction vessel while the water and acid can be removed by fractionation. As the description proceeds, it will be apparent that the lower boiling aliphatic acids can be reacted in accordance with our process with a large number of the higher alcohols to form fully esterified products.

This invention has as an object to provide a process for reacting an aliphatic acid with an alcohol having a boiling point higher than the acid to produce an ester having a higher boiling point than the acid. A further object is to provide a process in which the reaction is more complete, more rapid and gives better yields than are obtained by methods hitherto known in the prior art. Another object is to provide an acid esterification process wherein the losses of acid and other components used are quite low. A still further object is to provide an esterification process wherein the quantity of neutralizing materials employed is lowered. Another object is to provide a process wherein an anhydrous fully esterified organic ester of high quality may be produced. It is also an object to provide an esterification process which is simple and may be operated at low cost. Other objects will appear hereinafter.

These objects are accomplished by our invention which comprises an esterification process employing a material excess of aliphatic acid over that required for complete esterification of all the hydroxyl groups of the higher alcohols under treatment. By mass action effect of the excess acid a favorable shift in the esterification reaction is caused to take place. By employing certain aliphatic acids the necessity of adding a hydrocarbon to remove reaction is water eliminated. By these steps and the several other steps to be described in detail an anhydrous fully esterified organic ester may be prepared.

For a more complete understanding of the invention, reference is made to the accompanying drawing forming a part of the specification.

Fig. 1 is a semi-diagrammatic side elevation of one form of commercial apparatus in which our process may be carried out, certain parts being shown on an exaggerated scale for clarity.

In Fig. 1, 1 represents a steam jacketed reaction vessel. Steam may be supplied and withdrawn by means of the conduits 12 and 13. Other means of heating may be employed, such as hot oil, mixtures of organic compounds, molten alloys or even electrical heating if desired. Reaction vessel 1 is provided with an inlet pipe 2 for charging the reactants and an outlet conduit 10 for withdrawing the ester and other constituents from the reaction vessel.

A rectifying column 3 is connected to reaction vessel 1 by means of conduits 14, 16 and 17. All of these conduits may be provided with valves or other mechanism for closing them off or causing by-pass as may be required in carrying out the esterification process. Rectifying column 3 may be constructed in a number of different ways, such as bubble plate, tubular or packed, for example. Inasmuch as during some steps of our process we apply a vacuum to this column, we prefer to use a packed column so that by discontinuing reflux and applying a vacuum, this column functions simply as a straight piece of pipe.

A water cooled tubular condenser 4 is attached to the upper portion of column 3 by means of outlet conduit 18. Reflux may be returned to column 3 by means of valved conduits 19 and 21. Cooling medium may be supplied to condenser 4 by means of conduits 23 and 24.

An aqueous acid receiver 5 is connected with condenser 4 by means of valved conduit 19. This receiver is provided with the valved outlet pipe 26 for withdrawing aqueous acid.

Reaction vessel 1 is connected with tubular condenser 7 by means of valved conduit 14. This condenser is generally cooled to a lower temperature than condenser 4 by cooling a medium supplied and withdrawn by means of conduits 27 and 28.

Both condensers 4 and 7 are connected with vacuum receiver 6. Condenser 4 is connected through conduit 19 and valved conduit 29. Condenser 7 is connected through conduit 31.

Vacuum receiver 6 is provided with a pipe 9 which is connected to a suitable vacuum pump (not shown). A valved vent pipe 8 to the atmosphere is provided for changing the system to atmospheric pressure. The base of vacuum receiver 6 is provided with a valved outlet conduit 32 through which the vacuum distilled anhydrous organic ester may be withdrawn for storage or other purpose.

It is understood that the apparatus in Fig. 1 will include thermometers, flowmeters and the like equipment necessary to assist in controlling the reaction. In the apparatus setup shown or other suitable apparatus, the esterification may be carried out, first to produce the crude organic ester and then the apparatus may be subsequently employed for the purification and vacuum distillation treatment which may be applied to the ester to obtain the highly purified product.

Our process for producing organic esters may be practiced with several modifications. The following Examples I and II are set forth to illustrate the preferred procedure for carrying out our invention. The other examples set forth illustrate certain modifications that may be applied.

EXAMPLE I.—*Manufacture of tripropionin*

(1) React glycerine and excess (around 100% in this reaction is satisfactory, although 75%–300% may be employed), of propionic acid (in presence of sulphuric acid or other suitable catalyst) at temperature of 115° C. to 160° C. until all the reaction water has been removed. Dependent on details such as apparatus, concentration of acid, temperature of reaction and the like, reaction time varies from two to seven hours.

(2) Distill off water as azeotrope (B. P. 99° C.) with excess propionic acid, thereby causing complete esterification.

(3) Condense water-propionic acid azeotrope and return a portion for reflux with gradually decreasing of amount to assure separation of azeotrope.

(4) Treat crude tripropionin containing sulphuric acid and propionic acid with alkali (sodium carbonate or sodium propionate) to neutralize sulphuric acid.

(5) Apply vacuum to step 4 (variable vacuum around 20 m. m.), and distill off propionic acid using temperature of 90° to 160° C.

(6) The crude tripropionin resulting from step 5 is purified by either:

(a) 6A. Treat tripropionin from step 5 with sodium carbonate or sodium propionate and toluene.

7A. Filter the materials resulting from step 6A.

8A. Vacuum distill to remove toluene-water. (Water resulted from neutralizing step 6A with sodium salt.)

9A. Vacuum distill to remove pure tripropionin. Vacuum applied is less than 10 m. m. and temperature of still is approximately 150° C.

Or:

(b) 6B. Pass tripropionin from step 5 through filter to vacuum still, or in our apparatus, as shown, after filtering the ester may be brought back to the base heater.

7B. Vacuum distill off any propionic acid.

8B. Vacuum distill to remove pure tripropionin. Vacuum applied may vary, but less than 10 m. m. is preferred with the temperature of still at approximately 150° C. With a different degree of vacuum, different temperatures could be employed varying down to about 80° C. with very high vacuum to around 160–170° C. with little vacuum.

EXAMPLE II.—*Manufacture of ethylene glycol dipropionate*

(1) React ethylene glycol and excess (about 100% in this reaction) of propionic acid (in presence of sulphuric acid or other suitable catalyst) at temperature of 115° to 160° C. until all the reaction water has been removed.

(2) Distill off water as azeotropic (B. P. 99° C.) with excess propionic acid, thereby causing complete esterification.

(3) Condense water-propionic acid azeotrope and return for reflux in the ratio of between 3 and 6:1 at start and then gradually decrease to assure separation of azeotrope.

(4) Treat crude ethylene glycol dipropionate containing sulphuric acid and propionic acid with alkali (sodium carbonate or sodium propionate) to neutralize sulphuric acid.

(5) Apply vacuum to step 4 (around 20 m. m.) and distill off propionic acid using temperature of 90° to 150° C.

(6) The ethylene glycol dipropionate resulting from step 5 may be purified by either:

(a) 6A. Treat ethylene glycol dipropionate from step 5 with sodium carbonate or sodium propionate and toluene.

7A. Filter 6A.

8A. Vacuum distill to remove toluene water (water resulted from neutralizing step 6A with sodium salt).

9A. Vacuum distill to remove pure ethylene glycol dipropionate. Vacuum applied is preferably less than 10 m. m. with temperature of still at approximately 115° C.

Or:

(b) 6B. Pass ethylene glycol dipropionate from step 5 through filter to vacuum still or to container for subsequent return to base heater of apparatus shown.

7B. Vacuum distill off any propionic acid.

8B. Vacuum distill to remove pure ethylene glycol dipropionate. Vacuum applied is preferably less than 10 m. m. and temperature of still is approximately 115° C.

The above examples on our preferred embodiment have been set forth merely for the purpose of illustration. As indicated there are a number of variables in the process. While in all instances it is necessary that a material excess of aliphatic acid be employed, the exact excess may vary depending on the type of equipment, temperatures employed, and length of reaction. Generally, between 60% and about 300% excess propionic acid would be employed. However, it is preferred to employ around 100% or higher rather than lower amounts.

Likewise, the length of time required for complete reaction of the glycerine and the propionic acid depends on the type of apparatus and the concentration of the reacting materials. Employing temperatures between 100° and 200° C., the reaction can be accomplished within two to seven hours.

A suitable reflux in the above examples would be as stated, namely, somewhere between 3 and 6:1, and preferably around about 5:1. In other words, distill about 6 times as much as is drawn off. This reflux will be gradually decreased as the process proceeds.

The temperatures employed during the vacuum treatment will vary depending upon the degree of vacuum. The higher the vacuum, the lower the temperature is which may be employed. We prefer to vary the vacuum, employing a higher vacuum as the acid in the mixture becomes smaller. In the step of vacuum distilling the tripropionin, it is preferred to use the highest vacuum obtainable as a more satisfactory product will be obtained in this manner.

The above preferred embodiments represent a great improvement on the various methods now employed for manufacturing organic esters from the higher alcohols and aliphatic acids. The following examples are modifications of our preferred embodiment and, while not producing results as superior as those obtained in accordance with the preferred embodiment, produce results considered superior to processes of the prior art.

EXAMPLE III.—*Manufacture of benzyl isobutyrate*

(1) React benzyl alcohol and excess (around 100% in this reaction) of isobutyric acid at a temperature of 130° C. to 175° C. until all the reaction water has been removed (approximately two to three hours in this reaction.)

(2) Distill off water as azeotrope (B. P. 99° C.) with excess isobutyric acid, thereby causing complete esterification.

(3) Condense water-isobutyric acid azeotrope and return a portion for reflux, gradually decreasing the portion to assure separation of azeotrope.

(4) (In this reaction no alkali treatment is necessary because no catalyst, as sulphuric acid, was used.)

(5) Apply vacuum to step 3 (around 20 m. m.) and distill off remaining isobutyric acid using temperature of 90° C. to 130° C.

(6) The benzyl isobutyrate resulting from step 5 may be purified either by:

(a) 6A. Treat benzyl isobutyrate from step 5 with sodium carbonate or sodium isobutyrate and toluene.

7A. Filter 6A.

8A. Vacuum distill to remove toluene-water (water resulted from neutralizing step 6A with the salt.)

9A. Vacuum distill to remove pure benzyl isobutyrate. Vacuum applied is less than 10 m. m. and temperature of still is approximately 120° C.

or:

(b) 6B. Pass benzyl isobutyrate from step 5 to vacuum still. (Filtration may be dispensed with since step 4 was eliminated.)

7B. Vacuum distill off any isobutyric acid.

8B. Vacuum distill to remove pure benzyl isobutyrate. Vacuum applied is less than 10 m. m. and temperature of still of approximately 120° C.

EXAMPLE IV.—*Manufacture of benzyl valerate*

(1) React benzyl alcohol and excess (about 50%–150% in this reaction) of valeric acid at temperature of 130° C. to 175° C. until all the reaction water has been removed. (Approximately two to five hours in this reaction.)

(2) Fractionate off water (100° C.) with excess valeric acid, thereby causing complete esterification.

(3) Condense water with traces of valeric acid and return for reflux in thee ratio of approximately 2:1 at start and then gradually decreasing to assure separation of water containing little acid.

(4) (In this reaction no alkali treatment is necessary because no catalyst, as sulphuric acid, is used.)

(5) Apply vacuum to step 3 (around 20 m. m.) and distill off valeric acid using temperature of 80° C. to 150° C.

(6) The benzyl valerate resulting from step 5 is purified by either:

(a) 6A. Treat benzyl valerate from step 5 with sodium carbonate or sodium valerate and toluene.

7A. Filter 6A.

8A. Vacuum distill to remove toluene-water (water resulted from neutralizing step 6A with sodium salt.

9A. Vacuum distill to remove pure benzyl valerate. Vacuum applied is less than 10 m. m. and temperature of still is approximately 130° C.

Or preferably:

(b) 6B. Pass benzyl valerate from step 5 to vacuum still. (Filtration is not necessary since step 4 was eliminated.)

7B. Vacuum distill off any valeric acid.

8B. Vacuum distill to remove pure benzyl valerate. Vacuum applied is less than 10 m. m. and temperature of still is approximately 130° C.

EXAMPLE V.—*Manufacture of benzyl isovalerate*

(1) React benzyl alcohol and excess (around 100% in this reaction) of isovaleric acid at a temperature of 130° C. to 175° C. until all the reaction water has been removed (approximately two to three hours in this reaction).

(2) Fractionate off water (100° C.) with excess isovaleric acid, thereby causing complete esterification.

(3) Condense water with traces of isovaleric acid and return for reflux in the ratio of approximately 2:1 at the start and then gradually decreasing to assure separation of water containing little acid.

(4) (In this reaction no alkali treatment is necessary because no catalyst, as sulphuric acid, is used.)

(5) Apply vacuum to step 3 (around 20 m. m.) and distill off isovaleric acid using temperature of 80° to 150° C.

(6) The benzyl isovalerate resulting from step 5 is purified by either:

(a) 6A. Treat benzyl isovalerate from step 5 with sodium carbonate or sodium isovalerate and toluene.

7A. Filter 6A.

8A. Vacuum distill to remove toluene-water (water resulted from neutralizing step 6A with sodium salt).

9A. Vacuum distill to remove pure benzyl isovalerate. Vacuum applied is less than 10 m. m. and temperature of still is approximately 130° C.
Or preferably:
(b) 6B. Pass benzyl isovalerate from step 5 to vacuum still (filtration is not necessary since step 4 was eliminated).
7B. Vacuum distill off any isovaleric acid.
8B. Vacuum distill to remove pure benzyl isovalerate. Vacuum applied is less than 10 m. m. and the temperature of still is approximately 130° C.

EXAMPLE VI.—*Manufacture of triacetin*

(1) React glycerine and excess (around 100% in this reaction) of acetic acid (in presence of sulphuric acid or other suitable catalyst) at temperature of 105° to 150° C. until all the reaction water has been removed (four to eight hours in this reaction).

(2) Fractionate off water (100° C.) with excess acetic acid thereby causing complete esterification.

(3) Condense water with acetic acid traces and return for reflux in the ratio of approximately 8:1 at start and then gradually decreasing to assure separation of water containing little acid.

(4) Treat crude triacetin containing sulphuric acid and acetic acid with alkali (sodium carbonate or sodium acetate) to neutralize sulphuric acid.

(5) Apply vacuum to step 4 (around 20 mm.) and distill off acetic acid using temperature of 80° C. to 150° C.

(6) The triacetin resulting from step 5 is purified by either:
(a) 6A. Treat triacetin from step 5 with sodium carbonate or sodium acetate and toluene.
7A. Filter 6A.
8A. Vacuum distill to remove the toluene-water (water resulted from neutralizing step 6A with sodium salt).
9B. Vacuum distill to remove pure triacetin. Vacuum applied is less than 10 m. m. and temperature of still is approximately 140° C.
Or:
(b) 6B. Pass triacetin from step 5 through filter to vacuum still.
7B. Vacuum distill off any acetic acid.
8B. Vacuum distill to remove pure triacetin. Vacuum applied is less than 10 m. m. and temperature of still is approximately 140° C.

EXAMPLE VII.—*Manufacture of tributyrin*

(1) React glycerine and excess (100% in this reaction) of butyric acid (in presence of sulphuric acid catalyst) at temperature of 130° to 175° C. until all the reaction water has been removed. (Approximately two to three hours in this reaction.)

(2) Fractionate off water (100° C.) with excess butyric acid and thereby cause complete esterification.

(3) Condense water with trace of butyric acid and return for reflux in the ratio of approximately 2:1 at start and then gradually decrease the reflux to assure separation of pure water.

(4) Treat crude tributyrin containing sulphuric acid and butyric acid with alkali (sodium carbonate or sodium butyrate) to neutralize sulphuric acid.

(5) Apply vacuum to step 4 (around 20 m. m.) and distill off butyric acid using temperature of 90° to 160° C.

(6) The tributyrin resulting from step 5 is purified by either:
(a) 6A. Treat tributyrin from step 5 with sodium carbonate or sodium butyrate and toluene.
7A. Filter 6A.
8A. Vacuum distill to remove toluene-water (water resulted from neutralizing step 6A with the alkaline salt).
9A. Vacuum distill to remove pure tributyrin. Vacuum applied is less than 10 m. m. and temperature of still is approximately 185° C.
Or:
(b) 6B. Pass tributyrin from step 5 through filter to vacuum still.
7B. Vacuum distill off any butyric acid.
8B. Vacuum distill to remove pure tributyrin. Vacuum applied is less than 10 m. m. and temperature of still is approximately 185° C.

While in the above examples we have described about 100% excess as being satisfactory, it is understood that this amount may be varied as within the range described in Example I. In all instances a material excess of acid will be employed. There should be sufficient acid to esterify all the hydroxyl groups of the particular alcohol or alcohols under treatment, sufficient acid, in some circumstances, as described in Examples I, II and III, to permit removal of the water of esterification as an azeotrope and a still further quantity of acid to exert a mass action effect assisting in causing complete esterification. By employing a material excess of acid in accordance with our invention it is possible to obtain a substantially complete esterification without adding anhydrides and other acids or employing additional expedients to cause complete esterification.

While we have described and prefer sulphuric acid as a catalyst, other suitable esterification catalysts such as chlorides, phosphoric acid and the like may be employed.

As clearly taught in Examples I, II and III, by employing excess acid in accordance with this feature of our invention, it is possible to remove water from the esterification bath at low temperatures, without the necessity of adding an additional component such as benzene or other hydrocarbon for the purpose of forming an azeotrope as has been a usual expedient prior to our invention.

By coupling our purification steps with our novel esterification steps, it is possible to produce not only a fully esterified product but also an anhydrous organic ester of a high state of purity. These organic esters may be employed in any of the ways that organic esters have heretofore been employed and are particularly suitable for use with various esters of cellulose. One particular use is for the purpose of plasticizing cellulose esters.

It is also apparent from the several examples that our process may be applied to a number of different acids. All the lower aliphatic acids (excepting formic) and comprising acetic, propionic, butyric, isobutyric, valeric and isovaleric, etc., and mixtures thereof to make mixed esters of polyhyric alcohols may be employed. The derivatives of aliphatic acids containing hydroxyl, halogen or other groups, such as chloroacetic, lactic, etc., may be employed.

There are a number of different alcohols which may be used. The monohydric alcohols (aliphatic or aromatic) having boiling points higher than the acid used and in which the ester formed boils higher than the acid used are satisfactory. Dihydric alcohols (glycols) and all derivatives in which one or more hydroxyl groups remain may be employed. Trihydric alcohols (glycerol) and all derivatives in which one or more hydroxyl groups remain are the preferred alcohols for the present reaction. As may be observed from Examples I and II, glycerol or glycerine, as it may be termed, functions very satisfactorily in our process. We prefer to use substantially C. P. glycerine containing about 5% water, although this process is not limited to the use of C. P. glycerine, other grades such as H. G. and Y. G. if commercially available may be used.

The process may also be applied to polyhydric alcohols (tetrahydric alcohols, pentilols, hexitols, etc.), and all derivatives in which one or more hydroxyl groups remain. Also any mixed organic compound (aliphatic or aromatic) (hydroxy acids, hydroxy ethers, etc.) in which one or more hydroxyl groups are present may be treated. Our process may also be applied to certain carbohydrates and related compounds and their derivatives in which one or more hydroxyls remain.

Examples of some of the above alternatives are set forth below for the purposes of illustration. These examples relate primarily to our novel method employing a mixture of aliphatic acids. It will be noted that various proportions of acids have been employed. It will also be noted in the given examples that certain concentrations of acetic acid in certain ratios with the total amount of excess acid present apparently govern the amount of and relationship of combined acetyl and propionyl.

Inasmuch as comparable steps have been described in some detail at other places in the present specification, brief description appears sufficient here.

EXAMPLE VIII.—*Manufacture of mixed esters*

(1) The following materials were reacted: (a) Glycerol (propionic acid 90%, acetic acid 10%), 100% excess, H$_2$SO$_4$ (½% wt. glycerol)

(2) Reflux and collect azeotrope boiling at about 99° C. until all reaction water has been removed. (Approximately 2–5 hours.)

(3) Cool to 120–140° C. and add Na$_2$CO$_3$ or other alkali (enough to neutralize H$_2$SO$_4$).

(4) Distill off excess propionic-acetic acid under vacuum.

(5) Filter, preferably, while warm.

(6) Fractionate under vacuum to remove last traces of acid and then collect ester.

Properties of ester:
Acidity _____ approximately __ .02407
Ester content, approximately, percent ___ 102.9
Mixed ester containing one acetyl per mol, approximately _____ percent __ 52.3

EXAMPLE IX.—*Manufacture of mixed esters*

(1) The following materials were reacted: Glycerol (propionic acid 80%, acetic acid 20%), 100% excess, H$_2$SO$_4$ (½% wt. glycerol).

(2) Reflux and collect azeotrope boiling at about 99.5° C. until all reaction water has been removed. (Approximately 2–5 hours.)

(3) Cool to 135° C. and add Na$_2$CO$_3$ or other alkali (enough to neutralize H$_2$SO$_4$).

(4) Distill off excess propionic-acetic acid under vacuum.

(5) Filter, preferably, while warm.

(6) May be treated in accordance with preceding examples.

Properties of ester:
Acidity _____ approximately __ .0074
Ester content, approximately, percent ___ 104.3
Mixed ester containing one acetyl per mol, approximately _____ percent __ 72.2

EXAMPLE X.—*Manufacture of mixed esters*

(1) The following material were reacted: Glycerol (propionic acid 70%, acetic acid 30%), 100% excess, H$_2$SO$_4$ (½% wt. glycerol).

(2) Reflux and collect azeotrope boiling at about 100° C. until all reaction water has been removed. (Approximately 2–5 hours.)

(3) Cool to 135° C. and add Na$_2$CO$_3$ or other alkali (enough to neutralize H$_2$SO$_4$).

(4) Distill off excess propionic-acetic acid under vacuum.

(5) Filter, preferably, while warm.

(6) May be treated in accordance with previous examples.

Properties of ester:
Acidity _____ approximately __ .0126
Ester content, approximately, percent ___ 105.5
Mixed ester containing one acetyl per mol, approximately _____ percent __ 96.9

The above values are set forth for the purposes of illustration and may be somewhat varied. For example, while cooling to 135° C. is satisfactory, the materials may be cooled to a higher or lower temperature.

The functioning of the apparatus shown is quite readily apparent from the legend on the drawing. The reactants, aliphatic acid, a higher alcohol and generally a catalyst, are charged into the reaction vessel 1 through charging pipe 2. In accordance with our preferred embodiment for producing tripropionin, also referred to as glyceryl tripropionate, the charge placed in the reaction vessel 1 would comprise substantially chemically pure glycerine containing about 5% water, together with 100% propionic acid added in amounts of 60% or more in excess of that required for complete esterification. Sulphuric acid is added as a catalyst. The reaction mixture is heated by a heating medium supplied at 12 and the reaction is carried out for several hours. In the case of propionic acid, when the reaction mixture is heated to boiling there is formed an azeotrope of propionic acid and water which boils at 99° C. under standard conditions. This azeotrope may be removed continuously through an attached fractionating column 3, the azeotrope, containing approximately 18% propionic acid, being collected in aqueous acid receiver 5.

A small amount of the azeotrope is allowed to return to the unit through conduit 21 to enhance refluxing. Some of the azeotrope is weighed and acidity determined in order that the course of the reaction may be followed and completion of esterification noted. Observation of the temperature changes also assists in this respect.

Preferably the reflux is gradually decreased as the reaction proceeds. After removal of substantially all the water of reaction which, in a sense, means the removal of substantially all the water in the system, the reflux will have increased to practically pure acid. In the specific instance under discussion the acid will comprise practically pure propionic acid boiling at about 139° C.

At this point the neutralization step 4, which is clearly described in the examples, may be applied by supplying the alkali through conduit 2. In this step of the various examples as well as steps 6A the sodium salts or sodium carbonate have been described for the purpose of illustration and are very satisfactory alkalis. However, the calcium and/or potassium salts or other alkalis may be employed hence our invention is not to be limited in this respect. Thereafter a suitable degree of vacuum is applied to condenser 4, for example, and the excess acid removed as described in step 5 of the various examples. Since reflux has been discontinued to the column, it will no longer be acting as a rectifier but will function merely as a straight piece of pipe.

The reaction mixture now remaining in reaction vessel 1 will be comprised principally of the crude organic ester being prepared. The organic ester in the case of Example I, glyceryl tripropionate, is then purified. For example, it may be tapped through conduit 10 through a filter to another apparatus similar to Fig. 1 and operating in conjunction therewith. Or it may be filtered and after reaction vessel 1 has been properly cleaned, the filtered organic ester, glyceryl tripropionate, may be returned to reaction vessel 1. There the organic ester may be subjected to the vacuum distillation steps 7b and 8b as already described, or the crude tripropionin may be sent through a separate vacuum distillation apparatus for the final purification for the production of purified glycerol tripropionate. In carrying out these vacuum distillation steps the valves in conduits 16 and 17 may be closed and the valve in conduit 14 opened, thereby permitting the utilization of condenser 7 in the recovery of the purified organic ester in vacuum receiver 6. The purified ester may be withdrawn through conduit 32.

From the foregoing it will be apparent that our invention may be carried out in various ways. It will also be understood that the customary precautions for preventing heat losses by suitable insulation will be observed. The parts which contact the acids and other corrosive components are made of materials suitable for that purpose. For example, certain copper and aluminum alloys, iron silicon alloys or stainless steel. The steels known as KA2S, KA2SMo and associated steels are very satisfactory. These steels comprise around 18% chromium, 8-10% nickel, a small amount of carbon, generally under .12% and preferably under .07%, together with small amounts of molybdenum, copper, tungsten and the like. When we refer to boiling points and the like, we refer to this data as being obtained under standard conditions.

We claim as our invention:

1. A process for reacting a lower aliphatic acid with a higher alcohol having a higher boiling point than the acid, to produce an organic ester having a higher boiling point than the acid, which comprises reacting alcohol with a 75% to 300% excess of a lower aliphatic acid, distilling water and a substantial amount of acid from the reaction mixture during the reaction period, whereby the degree of esterification is increased, condensing the distillate, refluxing a portion of the condensate to the reaction mixture at a predetermined rate, decreasing the rate of reflux as the esterification reaction proceeds to completion, and then subjecting the reaction mixture after substantially all the water has been removed to a distillation treatment under reduced pressure to remove any unreacted acid.

2. A process for reacting a lower aliphatic acid with a dihydric alcohol having a higher boiling point than the acid, to produce an organic ester of high purity having a higher boiling point than the acid, which comprises reacting said alcohol with 75% to 300% excess of the aliphatic acid, distilling water from the reaction mixture, whereby the degree of esterification is increased, condensing the distillate, refluxing a portion of the condensate at a predetermined rate to the reaction mixture, gradually decreasing the rate of reflux as the esterification proceeds to completion, then subjecting the reaction mixture, after substantially all the water has been removed, to a distillation treatment under reduced pressure to remove any unreacted acid, withdrawing the ester produced, treating the crude ester with an alkali, filtering the resultant mixture, and subjecting the filtered ester to a vacuum distillation treatment.

3. A process for reacting a lower aliphatic acid with a higher alcohol having a higher boiling point than the acid, to produce an organic ester having a higher boiling point than the acid, which comprises reacting for between 2–7 hours, the alcohol with 75% to 300% excess of the lower aliphatic acid capable of forming an azeotrope with water, distilling water from the reaction mixture as an azeotrope with acid, condensing the distillate, refluxing a portion of the condensate at a predetermined rate to the reaction mixture, gradually decreasing the rate of reflux as the esterification reaction proceeds to completion, and then subjecting the reaction mixture, after substantially all the water has been removed, to a distillation treatment under reduced pressure to remove acid.

4. A process for reacting a lower aliphatic acid with a higher alcohol having a higher boiling point than the acid, to produce an organic ester having a higher boiling point than the acid, which comprises reacting an alcohol with a 50% to 300% excess of a lower aliphatic acid capable of forming an azeotrope with water, distilling a water-acid azeotrope from the reaction mixture, condensing the distillate, refluxing a portion of the condensate at a predetermined rate to the reaction mixture, gradually decreasing the rate of reflux as the esterification proceeds to completion, then subjecting the reaction mixture after substantially all the water has been removed to a distillation treatment under reduced pressure to remove acid, withdrawing and filtering the resultant ester mixture, and then subjecting the filtered ester to vacuum distillation treatment.

5. A process for reacting propionic acid with an alcohol having a higher boiling point than the acid, to produce an ester having a higher boiling point than the acid, which comprises catalytically reacting the higher alcohol with a material excess of the aliphatic acid more than sufficient to form an azeotrope with water, distilling water from the reaction mixture as an azeotrope with excess propionic acid boiling at about 99° C. whereby the degree of esterification is increased, condensing the distillate, refluxing a portion of the condensate to the reaction mixture, then subjecting the reaction mixture after substantially all the water has been removed to an alkali treatment and distillation under reduced pressure to remove acid.

6. A process for reacting a propionic acid with a higher alcohol having a higher boiling point than the acid to produce an organic ester having a higher boiling point than the acid, which comprises reacting the alcohol with 75% to 300% excess of propionic acid, distilling a water propionic acid azeotrope from the reaction mixture, condensing the distillate, refluxing a portion of the condensate at a predetermined rate to the reaction mixture, gradually decreasing the rate of reflux as the esterification reaction proceeds to completion, then subjecting the reaction mixture, after substantially all the water has been removed, to a distillation treatment under reduced pressure to remove unreacted propionic acid, and purifying the organic ester produced.

7. A process for producing glycerine tripropionate which comprises reacting glycerine with a material excess of propionic acid in the presence of an acid catalyst, distilling water from the reaction mixture as an azeotrope with excess propionic acid, condensing the water-propionic acid azeotrope, returning a portion of this condensate to the reaction mixture, then subjecting the reaction mixture, after substantially all the water has been removed, to an alkali addition to react with the catalyst and then distillation under reduced pressure to remove unreacted propionic acid.

8. A process for reacting propionic acid with a higher alcohol having a higher boiling point than the acid, to produce an organic ester having a higher boiling point than the acid, which comprises reacting the alcohol with 60% to 300% excess of the propionic acid, distilling water from the reaction mixture as an azeotrope with excess propionic acid, condensing the distillate, refluxing a portion of the condensate at a predetermined rate to the reaction mixture, gradually decreasing the rate of reflux as the esterification proceeds to completion, then subjecting the reaction mixture, after substantially all the water has been removed, to a distillation treatment under reduced pressure to remove unreacted propionic acid, withdrawing and filtering the resultant ester mixture, and subjecting the filtered ester to vacuum distillation treatment.

9. A process for reacting propionic acid with ethylene glycol to produce an organic ester which comprises reacting ethylene glycol with a material excess of propionic acid in the presence of an esterification catalyst, distilling water from the reaction mixture as an azeotrope with excess propionic acid, condensing the water-propionic acid azeotrope and returning a portion of this condensate to the reaction mixture, subjecting the reaction mixture to an alkali treatment and then to distillation under reduced pressure, and purifying the organic ester produced.

10. A process for reacting isobutyric acid with benzyl alcohol to produce a fully esterified product having a higher boiling point than the acid, which comprises reacting benzyl alcohol with a material excess of isobutyric acid, distilling water from the reaction mixture as an azeotrope with isobutyric acid whereby the degree of esterification is increased, condensing the distillate, refluxing a portion of the condensate to the reaction mixture, then subjecting the reaction mixture, after substantially all the water has been removed, to a distillation treatment under reduced pressure to remove isobutyric acid.

11. The process of reacting a lower aliphatic acid with an alcohol having a higher boiling point than the acid to produce an organic ester having a higher boiling point than the acid, which comprises catalytically reacting said alcohol with greater than a 50% excess of said aliphatic acid, carrying out the reaction for 2-7 hours at temperatures which include heating the reaction mixture to as high as 150° C., removing both acid and water, whereby the degree of esterification is increased, and subjecting the reaction mixture, after substantially all the water and at least a substantial part of the acid have been removed, to an alkali treatment.

12. The process of reacting a lower mono-carboxylic aliphatic acid with an alcohol having a higher boiling point than the acid to produce an organic ester having a higher boiling point than the acid, which comprises catalytically reacting the alcohol with at least about 75% excess of the lower mono-carboxylic aliphatic acid, carrying out the reaction for 2-7 hours at temperatures greater than 120° C. but less than 200° C., distilling both acid and water from the reaction mixture whereby the degree of esterification is increased, and subjecting the reaction mixture after substantially all the water and acid have been removed, to a treatment for purifying the organic ester produced.

13. A process for reacting a propionic acid having a boiling point of about 139° C. with glycerine to produce glycerine tripropionate which comprises reacting the glycerine with a material excess of the propionic acid, distilling off water from the reaction mixture with excess propionic acid as an azeotrope boiling at about 99° C., thereby facilitating complete esterification, and subjecting the reaction mixture after substantially all the water and acid have been removed to treatment with alkali and reduced pressure for further purifying the glycerine tripropionate produced.

14. A process for reacting an acid component with a higher alcohol having a higher boiling point than said acid component, to produce a fully esterified ester, which comprises reacting for between 2-7 hours the higher alcohol with a 50%-300% excess of an acid component from the group consisting of lower aliphatic acids, hydroxy substituted lower aliphatic acids, and halogen substituted lower aliphatic acids, distilling simultaneously at least some of the excess acid component and esterification water from the reaction mixture during reaction, condensing the distillate, refluxing a portion of the condensate to the reaction mixture at a predetermined rate, decreasing the rate of reflux as the esterification reaction proceeds to completion, and then subjecting the reaction mixture after substantially all of the water has been removed, to a distillation treatment under reduced pressure.

15. A process for the manufacture of fully esterified organic esters, which comprises reacting in the presence of an esterification catalyst an excess of at least two lower aliphatic acids, carrying out the reaction for more than two hours during the reaction, distilling off both acid and water, condensing the distillate, refluxing a portion of the condensate to the reaction mixture, and subjecting the reaction mixture to a distillation treatment under reduced pressure for removing unreacted acid.

16. A process for the manufacture of fully esterified esters, which comprises reacting in the presence of an esterification catalyst, a higher alcohol with a substantial excess of propionic acid and at least one other lower aliphatic acid, during the reaction distilling off both acid and water, condensing the distillate, refluxing a portion of the condensate to the reaction mixture and subjecting the reaction mixture to distillation under reduced pressure to remove any unreacted acid.

17. A process for reacting an acid component with a higher alcohol having a higher boiling point than said acid component, to produce a fully esterfied ester, which comprises reacting the higher alcohol with a 75%–300% excess of an acid component from the group consisting of lower aliphatic acids, hydroxy substituted lower aliphatic acids, halogen substituted lower aliphatic acids, distilling both excess acid component and water from the reaction mixture during reaction, condensing the distillate, returning the condensate as reflux, subjecting the mixture to distillation under reduced pressure for removing unreacted acid, and purifying the fully esterified ester produced by steps including filtering the vacuum distillation.

18. A process for reacting a lower aliphatic acid with an alcohol having a higher boiling point than the acid, to produce an organic ester having a higher boiling point than the acid, which comprises reacting in the presence of an esterification catalyst, for a sufficient length of time to produce said fully esterified ester, an alcohol with 60%–300% excess of a lower aliphatic acid capable of forming an azeotrope with water, employing at least a part of said excess acid for removing water from the reaction mixture as an azeotropic mixture, condensing the mixture, refluxing a portion of the condensate to the reaction and subjecting the reaction mixture to distillation under reduced pressure for removing excess acid remaining.

LESTER W. A. MEYER.
FREDERICK R. CONKLIN.